United States Patent [19]
Bartlett

[11] 3,861,110
[45] Jan. 21, 1975

[54] BUMPER GUARD

[75] Inventor: Gary F. Bartlett, Muncy, Pa.

[73] Assignee: Construction Specialties, Inc., Cranford, N.J.

[22] Filed: Mar. 19, 1974

[21] Appl. No.: 452,513

Related U.S. Application Data

[63] Continuation of Ser. No. 300,735, Oct. 25, 1972, abandoned.

[52] U.S. Cl. .................................. 52/718, 293/1
[51] Int. Cl. ............................................. E04f 19/02
[58] Field of Search ........... 24/73 P, 73 FT; 52/716, 52/717, 718, 393, 402, 288, 403, 287; 256/59, 65; 293/1, 71 R, 62; 16/86 R, 86 A

[56] References Cited
UNITED STATES PATENTS

| | | | |
|---|---|---|---|
| 2,681,716 | 6/1954 | Black | 52/718 |
| 3,016,590 | 9/1971 | Shanok | 52/718 |
| 3,606,431 | 9/1971 | Kunevicius | 293/62 |

*Primary Examiner*—John E. Murtagh
*Attorney, Agent, or Firm*—Brumbaugh, Graves, Donohue & Raymond

[57] ABSTRACT

A bumper guard for protecting a wall or other surface comprises an elongated retainer mounted on the protected surface and an elongated bumper member of a highly impact resistant, tough, resilient material and having, in cross-section, divergent legs, each of which has an inwardly facing channel at the free end. When in place on the retainer, the channels fit over the side edges of the retainer, and the legs are resiliently sprung outwardly to provide pre-load forces that hold the bumper member in place. Upon an impact, the legs are further sprung apart and thereby absorb and store energy which is recovered in the form of return forces that urge the bumper member back into its normal place on the retainer. The geometry of the bumper member and retainer, relative to the protected surface, are such that the bumper member is prevented from contacting the protected surface, regardless of the degree of deformation and deflection of the bumper member. An end cap finishes the ends of the bumper guard and is mounted on the bumper member in a manner that affords substantially free deflection with the bumper member if it is impacted.

11 Claims, 7 Drawing Figures

PATENTED JAN 21 1975 3,861,110

BUMPER GUARD

This is a continuation, of application Ser. No. 300,735, filed Oct. 25, 1972, now abandoned.

BACKGROUND OF THE INVENTION

In many types of commercial and industrial buildings, such as hospitals, nursing homes, stores, manufacturing plants and research laboratories, the wall surfaces, especially in corridors, are subject to abuse by being accidentally struck and damaged by carts, wagons, wheelchairs and equipment moved or transported about the building. In an effort to minimize damage from impact, one common practice has been to cover the wall with a durable facing material, such as metal or plastic plates. Such plates do help mitigate the damage but are inadequate to completely prevent damage of the underlying wall, which is still subject to cracking and breakage, since an impact to the plate is transferred directly to and must be absorbed by the underlying wall. Moreover, the plates themselves are frequently marred and dented by impacts and become unsightly and gradually less effective.

SUMMARY OF THE INVENTION

There is provided, in accordance with the invention, a bumper guard that entirely stops and absorbs all impacts that might otherwise be imposed on the protected surface and offers the further advantages of ease and flexibility of installation to permit mounting on walls of various types of construction. It is, moreover, esthetically pleasing, and retains its attractiveness over a long useful life without maintenance, despite even the most severe conditions. Since the bumper guard completely eliminates damage and the consequent costs of repair and maintenance of the protected surface, and since it is itself virtually maintenance free, it affords significant cost savings to the building owner. It comprises only two primary parts, both of which are readily mass-produced at low cost, and therefore the cost of the bumper guard is modest.

More particularly, a bumper guard, in accordance with the invention, comprises an elongated, continuous substantially rigid retainer that is mounted on the protected surface, usually in spaced relation, and receives an elongated, continuous impact-absorbing bumper member formed of a tough, resilient, impact-resistant material, preferably a synthetic polymeric material, a number of which are commercially available. The retainer has an elongate medial portion and, extending out from either edge of the medial portion, an elongated, retainer flange. Each flange has an outer free edge which is spaced from the protected surface. The retainer is mounted on the surface to be protected by a number of suitably spaced fasteners or brackets, the spacing and selection of which will depend on the structural and surface characteristics of the protected surface. The bumper member has, in cross-section, a medial portion, a pair of diverging leg portions extending out from the medial portion, and an inturned flange that defines an elongated channel at the outer end of each leg. When the bumper member is installed on the retainer, each bumper member channel is releasably received by the outer free edge of one of the retainer flanges. The interior or included angle between the diverging bumper member leg portions is slightly less in the bumper member as fabricated than the angle as installed on the retainer, and the bumper member is retained on the retainer by the inherent resiliency of the bumper material and pre-load forces introduced when the legs are spread and held apart upon mounting on the retainer.

The medial portion of the bumper member is substantially spaced from the medial portion of the retainer to permit deflection of the bumper member medial portion on impact and to afford absorption and temporary storage of the impact energy by resilient deformation of the bumper member. The angle between each leg of the bumper member and the protected surface under all degrees of deformation and deflection of such leg and the spacing from the protected surface of a point or zone of contact between such leg and the corresponding retainer flange are so related that the leg edges are precluded from contacting the protected surface for any extent and direction of deformation and deflection of the bumper member upon impact.

In one embodiment of the bumper guard, each retainer flange has an outwardly facing, convexly curved deflection surface adjacent to the outer free edge of the flange that provides a changing zone of contact between the corresponding bumper member leg and the retainer flange during impacting of the bumper member. The outwardly convex curvature of the deflection surface provides for an increase in the spacing of the contact zone between the retainer and the bumper member leg from the protected surface as the degree of deflection and deformation of the bumper member increases, thereby more greatly to ensure that the edges of the bumper do not contact the protected surface.

The retainer medial portion is of a cross-sectional shape that gives the retainer substantial lengthwise rigidity and strength. For example, the medial portion may include, in cross-section, an offset portion that forms an elongated recess. The offset portion, in addition to imparting rigidity to the retainer, provides a slot or keyway for receiving a spacer or bracket located between the retainer and the protected surface, and forming a part of the retainer mounting system. The mounting system may include any suitable fastening device or bracket, the form of which may, to some extent, be governed by the construction of the wall, and the fasteners or brackets may be spaced any appropriate distance along the retainer, consistent with the strength of the retainer. Advantageously, the mounting system may include a shock absorbent element, such as a slightly compressible spacer or washer, to minimize shockload transfer between the retainer and the wall or other member on which the bumper guard is mounted.

When two resilient bumper members are mounted end-to-end to provide a long run of the bumper guard, the deformation and deflection of the end portion of each bumper member adjacent the joint is transferred across the joint to the other bumper member by a splice in the form of a strip of resilient material that is shaped to match the internal contour of the bumper members and is mounted inside the end portions of the bumper members in engagement and overlapping relation with them.

Preferably, the ends of the bumper guard are finished by end caps that are mounted on an end portion of the resilient bumper member that extends longitudinally for a short distance beyond the end of the retainer. The end cap includes a mounting portion shaped in cross-section substantially to conform to the internal cross-sectional shape of the bumper member and received tightly within and retained by the bumper member. Since the end cap does not engage the retainer, it is free to deflect with the bumper member upon impact. The external portion of the end cap closes the hollow space between the bumper member and the retainer and may be shaped as desired to provide an attractive finishing end for the bumper guard.

BRIEF DESCRIPTION OF THE DRAWINGS

For a better understanding of the invention, reference may be made to the following description of exemplary embodiments, taken in conjunction with the figures of the accompanying drawings, in which.

DESCRIPTION OF EXEMPLARY EMBODIMENTS

Figure 1:
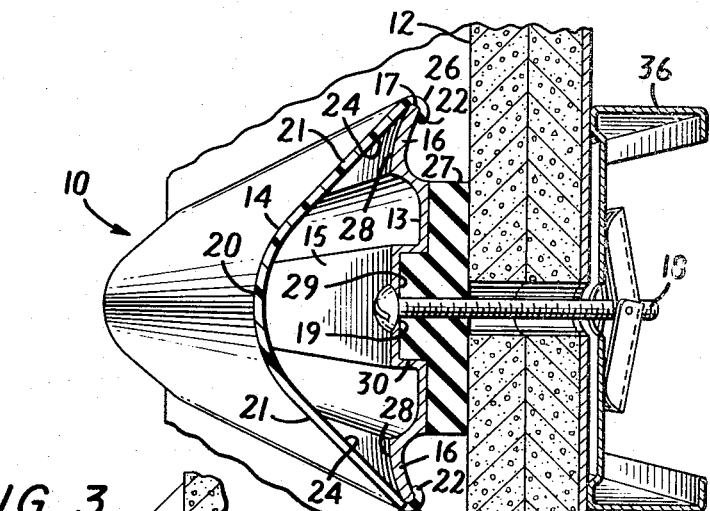
FIG. 1 is a perspective, end cross-sectional view of a bumper guard mounted on a wall.
Figure 3:
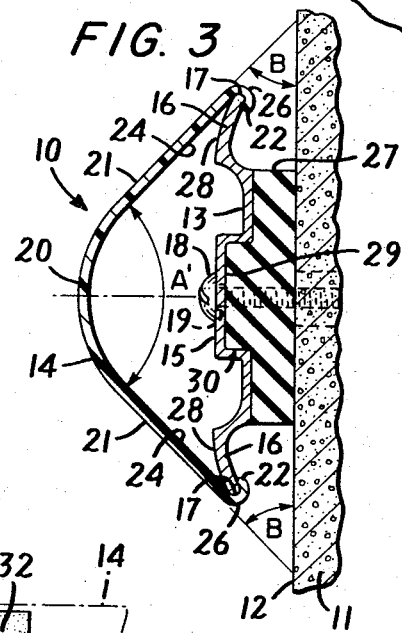
FIG. 3 is a cross-sectional view of the bumper guard shown in FIG. 1.

The bumper guard, which is designated in the drawings generally by the reference numeral 10, is appropriate for installation on any external surface, such as a wall, door, cabinet, partition, etc., having any combination of interior structural members and outer finishing surface layers such as plaster, plasterboard, wood, solid masonary walls and the like. In most applications, the bumper guard will be mounted on a wall parallel to the plane of the floor and located an appropriate distance above the floor for maximum effectiveness in absorbing impacts likely to be received by the wall in the particular application. The bumper guard will ordinarily be secured to sound structural elements of the wall on which it is mounted. In FIGS. 1 and 3, a bumper guard 10 is mounted on a plaster wall 11 having an outer surface 12 which is protected by the bumper guard.

Figure 7:
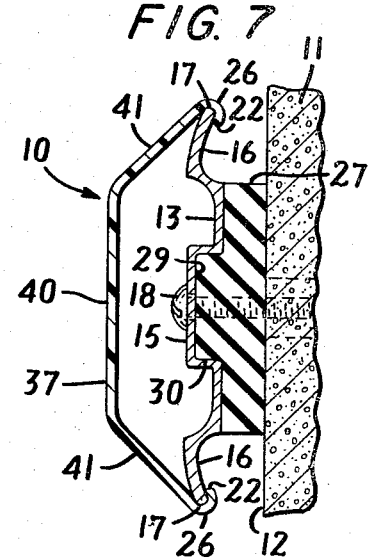
FIG. 7 is a cross-sectional view of a bumper guard having a modified form of resilient bumper member.

The bumper guard 10 includes an elongated retainer 13, preferably of uniform cross-section throughout its length, having longitudinal and transverse strengths appropriate to sustain the forces transferred to it, without experiencing any significant deformation or deflection during impacting of the bumper guard. Preferably the retainer 13 is formed of extruded alumimum, although acceptable alternatives include rolled or bent steel. The retainer has, in cross-section, a medial portion 15 and a pair of terminal retainer flanges 16 extending generally outwardly from the medial portion 15. As the bumper guard may on occasion be required to sustain and neutralize severe impacting, the retainer medial portion 15 is of a cross-sectional shape that gives the retainer substantial longitudinal and transverse rigidity. In FIGS. 1, 3 and 7, the retainer medial portion 15 has a longitudinally oriented offset 29 forming an elongated recess. The offset portion 29 is formed to impart substantial rigidity to the retainer 13, without adding to the problems or costs of fabricating the retainer. Each terminal retainer flange 16 has an outer free edge 17 that, as described below, is spaced from the protected surface 12. Also, for reasons described below, an exemplary embodiment of the bumper guard 10 includes retainer flanges 16 having, adjacent to the outer free edges 17, frontal deflection surface 28 that are outwardly convexly curved.

The retainer 13 is mounted on the protected surface 12 by a number of spaced-apart fasteners 18 that pass through holes 19 in the center of the medial portion. In FIG. 1, the fastener also passes through the plaster and a horizontally oriented steel girt 36 located parallel to the bumper guard and provided for the purpose of distributing the mounting forces required to hold the bumper guard 10 on the proteted surface. The fasteners 18 may be of any suitable type, such as the toggle bolt shown, depending on the type of construction of the external wall 11, but are preferably of a type capable of being installed through the wall after the wall is finished with some type of rear mounting support as shown in FIG. 1. The spacing of the fasteners 18 along the retainer 13 will depend on the strength of the retainer and the type of construction of the wall 11. The holes 19 may be pre-drilled in fixed locations or field drilled, as construction requirements dictate.

Advantageously, the bumper guard 10 has a spacer 27 between the retainer 13 and the protected surface 12. As may be seen in the plan view of FIG. 4, the spacer 27 is associated with the fastener 18, and in this embodiment does not extend the length of the retainer medial portion 15. The spacer 27 has an extension 30 shaped substantially to conform to the retainer medial offset 29. The spacer extension 30 is received by the retainer offset 29, the engagement of the spacer 27 and the retainer 13 limiting the vertical shifting between them when the bumper guard 10 is mounted on the protected surface 12. The spacer 27 may be fabricated of any material; however, an energy absorbing resilient material is preferred, in order to limit the shock transferred to the protected surface 12.

Figure 2:
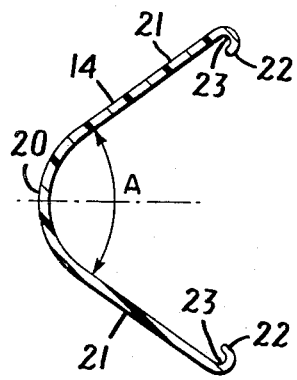
FIG. 2 is an end cross-sectional view of the resilient bumper member of the bumper guard shown in FIG. 1 and illustrates the cross-sectional shape of the bumper member prior to installation to the retainer.

Received on the retainer 13 is a resilient bumper member 14, having a medial portion 20 and a pair of diverging leg portions 21 that extend out from the medial portion 20. The outer end of each leg portion 21 has an inturned edge 22 defining an elongated, continuous channel 23 shown in FIG. 2. When the bumper member 14 is installed on the retainer 13 (see FIGS. 1 and 3), each channel 23 is releasably received by the edge 17 of the corresponding retainer flange 16. As may best be seen by comparing FIGS. 2 and 3, the interior angle A, defined by the leg portions 21 of the bumper member 14 as fabricated (FIG. 2) is slightly less than the corresponding Angle A' when the bumper member 14 is mounted on the retainer 13 (FIG. 3). The slight spreading apart of the legs 21 when the bumper member 14 is mounted on the retainer 13 and the resulting increase of the angle A, insures the retention of the bumper member 14 on the retainer 13 due to the inherent resiliency of the bumper material and the preload forces introduced when the legs are spread and held apart upon mounting on the retainer.

The medial portion 20 of the bumper member 14 is spaced a substantial distance from the medial portion 15 of the retainer 13, to allow the bumper guard 10 to deform and deflect a substantial amount and thereby absorb th energy of an impact. The bumper member 14 shown in FIGS. 1, 2, 3, 4 and 6, has a medial portion 20 that, in cross-section, is arcuate, and each bumper member leg 21 diverges tangentially from the medial portion 20. In an alternative form of bumper member 37, as shown in FIG. 7, the medial portion 40 is, in cross-section, a flat surface that is substantially parallel to the protected surface 12 when the bumper member 37 is mounted on the retainer 13 and curves relatively sharply where it merges with the legs 41.

As the bumper guard 10 is impacted, the bumper member 14 is deflected and deformed so that the medial portion 20 is displaced generally toward the retaining medial portion 15 and the inner surface 24 of each leg of the bumper member is pushed into sliding contact with a point or zone of the external portion of the retainer flange, adjacent to the outer free edge 17. Ordinarily, an impact to the bumper guard 10 is limited to an isolated, small segment of the bumber member which is greatly deformed and deflected. The effect of the impact, however, extends out in all directions from the immediate zone of direct impact and is manifested by zones of gradually decreasing deformation and deflection of the bumper member the further a given zone is from the immediate zone of impact. Therefore, at the point of impact, deflection and deformation of the bumper member toward the retainer will be greatest, with the resulting greater sliding contact between the inner surface 24 of each leg of the bumper member and the external portion of the retainer flange adjacent the corresponding outer free edge 17. Sometimes, the magnitude of the impact to the bumper guard will be sufficient completely to disengage the retainer edges 17 and the bumper member channels 23 along a section of the bumper member near the point of impact, but at some point spaced from the impact area the retainer edges 17 continue to receive the bumper member channels 23. At the instant during impact when the deflection and deformation of the bumper member 14 is at a maximum the energy stored in the bumper member during impact generates forces which urge the bumper member back to its normal position on the retainer. The return of the bumper member into position begins at the points where bumper member channels 23 continue to be received by the outer free edges 17 of the retainer flanges and continues toward the point of impact until the entire bumper member 14 is again received on the retainer 13. In other words, the bumper member pulls itself back onto the retainer by way of return forces generated upon the recovery of energy stored during impact.

The plane of each leg 21 of the bumper member 14 (as normally retained in place on the retainer 13) defines an angle B (see FIG. 3) with the plane of the protected surface 12. The angle B at each leg may differ in magnitude from the angle at the other leg, that is, the bumper member need not be symmetrical, relative to the wall surface. Moreover, an impact to the bumper guard along a plane that is not perpendicular to the wall, creates an unsymmetrical deflection of the bumper member. In any case, however, each angle B will decrease upon an impact to the bumper guard 10. As the angle B decreases during impact, the outer end 26 of the bumper member leg 21 moves toward the protected surface 12 and outwardly from the edge 17 of the retainer 13. Since the outer end 26 will move toward the protected surface 12 during impact, the edge 17 of the retainer 16 must be spaced apart from the protected surface 12. Preferably, the angle B, for all degrees of deformation and deflection of the bumper member legs 21, and the distance from the protected surface 12 to the point or zone of contact between the bumper member leg inner surface 24 and the external portion of the retainer flange adjacent the outer free edge 17 are so related that the outer end 26 of the bumper member leg 21 is precluded from contacting the protected surface 12 for any extent and direction of deformation and deflection of the bumper member on impact. In other words, no matter how sharply or from what frontal direction the bumper member 14 is struck, the bumper guard 10 is able to absorb and neutralize the impact without contact with or damage to the underlying surface by any part of the bumper member.

The outward convex curvature of the retainer deflection surface 28, as shown in FIG. 3, provides a zone of contact additional to the external portion of the retainer flange adjacent the outer free edge 17. As the bumper member medial portion 20 is impacted and approaches the retainer medial portion 15, the deflection surface 28 outwardly deflects the bumper member leg 21. Additionally, since the point of contact between the bumper member inner surface 24 and the retainer flange 16 will tend to move along the curved deflection surface 28 toward the retainer medial portion 15 as the bumper member medial portion 20 approaches the retainer upon impact, the distance from the protected surface 12 to the point of contact between the bumper member leg inner surface 24 and the retainer flange deflection surface 28 will increase slightly due to the outward convex curvature of the deflection surface and result in greater clearance between the outer end 26 of the bumper member leg 21 and the protected surface 12. The curvature of the deflection surface 28 also facilitates the installation of the bumper member 14 on the retainer 13 by serving as a camming surface by which the bumper member legs 21 are spread apart.

The installation of the bumper member is accomplished by positioning the bumper member 14 so that one of the channels 23 is received on a retainer edge 17, then pivoting the bumper member about the edge 17 until the inturned edge 22 of the opposite leg 21 rests on the deflection surface 28, and finally, pushing on the bumper member medial portion 20 in the direction of the exposed retainer edge 17 until the inturned edge 22, sliding across the deflection surface 28, then slips over the retainer edge 17 and the bumper member channel 23 is received on the retainer edge. By starting at one end of the bumper guard and working longitudinally along the bumper guard in the sequence outlined above, the entire bumper member may be easily and efficiently installed using the deflection surface 28 as a camming surface to spread apart the bumper member legs 21.

Figure 4:
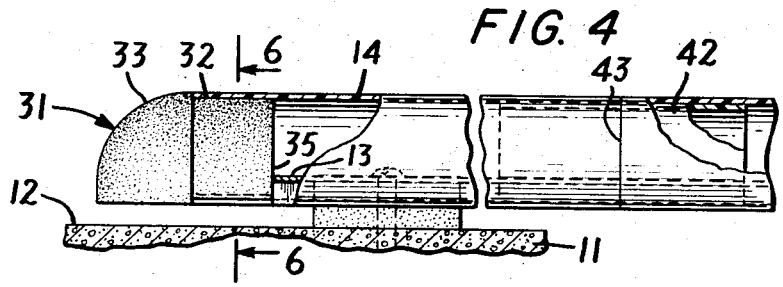
FIG. 4 is a plan view of the bumper guard with portions shown in cross-section to illustrate the manner of installation of an end cap and an appropriate splice between bumper members.

Occasionally, it will be necessary to mount two resilient bumper members 14 end-to-end to provide a long run of the bumper guard 10. By including a splice 42, as shown in FIG. 4, the deflection and deformation during impact of the end portion of each bumper member adjacent to the joint 43 is transferred across the joint to the other bumper member. The splice 42 is a strip of resilient material shaped to match the internal contour of the bumper members and is mounted at the joint 43 inside the end portion of each of the abutting bumper members. When mounted, the splice, in cross-section, extends from one channel 23 of the bumper member to the other so that each bumper member engages a portion of the splice. In addition to transferring the deflection and deformation from an impact across the joint 43, the splice 42 protects the end of each bumper member from an angular impact to the end portion of the abutting bumper member by preventing an object angularly impacting the end portion of one bumper member at a joint from striking the end of an abutting undeflected bumper member. With each bumper member overlapping and engaging a portion of a splice both bumper members deflect and deform upon impact and the bumper member ends are not exposed to damage from angular impacts to the bumper guard in the area of a joint.

Figure 5:
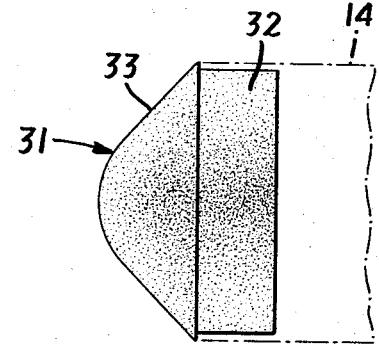
FIG. 5 is an elevation view of the end cap of FIG. 4 on a larger scale.
Figure 6:
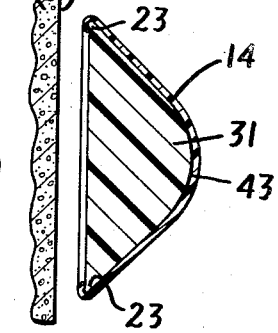
FIG. 6 is a cross-sectional view taken along line 6—6 in FIG. 4 and looking in the direction of the arows.

Preferably, each end of a run of the bumper guard 10 is finished by an end cap 31, as shown in various views in FIGS. 4, 5 and 6. As best seen in FIG. 4, the bumper member 14 extends a short distance beyond the retainer termination 35. The end cap 31 includes an internal mounting portion 32 and an external portion 33. The internal portion 32 substantially conforms in cross-sectional shape to the shape of the interior surface of the mounted bumper member 14, as shown in FIG. 6. When installing the cap 31, the internal portion 32 is inserted into and received tightly within the open end of the bumper member 14. The bumper member extends beyond the retainer termination 35 a sufficient distance so that the end cap 31 does not engage the retainer in any way. As the end cap 31 is inserted, glue is applied to a zone 43 (FIG. 6) to bond the end cap to the bumper member along the inner surface of the bumper member medial portion 20. Since the end cap 31 does not contact the retainer in any way, and is bonded only to the inner surface of the medial portion, the bumper member is free to deflect and deform upon impact and the end cap will be retained in place. The end cap external portion 33 closes the internal space defined by the bumper member 14 and may be shaped as desired to provide an attractive termination of the bumper guard.

Many other variations and modifications of the bumper guard will be apparent to those skilled in the art without departing from the spirit and scope of the invention. The above-described embodiments are, therefore, intended to be merely exemplary, and all such variations and modifications are intended to be included within the scope of the invention as defined in the appended claims.

I claim:

1. A bumper guard for mounting on a wall or other generally vertical surface to protect such surface from impact, comprising an elongated, continuous, substantially rigid retainer having in cross-section a medial portion and a pair of terminal retainer flanges extending from either edge of the medial portion, mounting means for affixing the retainer to the protected surface and for locating an outer free edge of each retainer flange at a predetermined distance from the protected surface, and an elongated continuous impact-absorbing bumper member formed of a tough, resilient, impact-resistant, synthetic polymeric material received on the retainer and having in cross-section a generally outwardly convex medial portion and a pair of divergent leg portions extending from the medial portion and defining an interior angle of substantially less than 180°, the free end of each leg portion having an inturned edge forming an elongated continuous inwardly open channel, each channel being normally received by the outer free edge of one of the terminal retainer flanges releasably to retain the bumper member on the retainer, the interior angle of the bumper member as formed being slightly less than the angle thereof when installed on the retainer whereby an initial force normally to retain the bumper member in place on the retainer results from the inherent resiliency of the bumper material, the medial portion of the bumper being substantially spaced from the medial portion of the retainer and being spaced at the greatest distance from the protected surface of any part of the bumper member such that impacts on the bumper member are normally on said medial portion thereby to permit deflection of the bumper member medial portion on impact and absorption of the energy of the impact by resilient deformation of the energy bumper member by substantial spreading of the legs thereof by a camming action of the retainer flanges, and (1) the angle between each leg of the bumper member and the protected surface under all degrees of deformation and deflection of such leg and (2) the spacing from the protected surface of a point or zone of contact between such leg and the corresponding retainer flange being so related as to preclude the edges of the legs from contacting the protected surface for any extent and direction of deformation and deflection of the bumper member upon impact.

2. A bumper guard according to claim 1, wherein each terminal retainer flange includes an outwardly convexly curved front deflection surface adjacent to the outer free edge thereof and defining a surface providing a changing zone of contact between the corresponding bumper member leg and such retainer flange outwardly to deflect the bumper member leg portions on deflection of the bumper member medial portion toward the retainer medial portion.

3. A bumper guard according to claim 1, wherein the mounting means includes an energy absorbing element between the retainer and the protected surface.

4. A bumper guard according to claim 1, wherein the bumper member extends longitudinally beyond the end of the retainer and further comprising an end cap member having an internal portion and an external portion, with respect to the bumper member, the internal portion substantially conforming to the internal shape of the bumper member and being bonded to the bumper member medial portion to retain the end cap member in the bumper member during impacting of the bumper guard, the end cap member internal portion as received within the bumper member being free from engagement with the retainer, thereby permitting deflection and deformation of the bumper member upon impact.

5. A bumper guard according to claim 1, wherein there are two bumper members mounted on a retainer in end-to-end abutting relation to form a joint and further comprising as a splice piece at the joint for transferring deformation across the joint a strip of resilient material shaped to match the internal contours of the bumper members and positioned such that a portion of each bumper member overlaps and engages a portion of the splice piece.

6. A bumper guard for mounting on a wall or other generally vertical surface to protect such surface from impact, comprising an elongated, continuous, substantially rigid retainer having in cross-section a medial portion and a pair of terminal retainer flanges extending from either edge of the medial portion, mounting means including a spacer received between the protected surface and a longitudinally oriented offset portion defining an elongated recess in the medial portion of the retainer for affixing the retainer to the protected surface and for locating an outer free edge of each retainer flange at a predetermined distance from the protected surface, and an elongated continuous impact-absorbing bumper member formed of a tough, resilient, impact-resistant, synthetic polymeric material received on the retainer and having in cross-section a generally outwardly convex medial portion and a pair of divergent leg portions extending from the medial portion and defining an interior angle of substantially less than 180 degrees, the free end of each leg portion having an inturned edge forming an elongated continuous inwardly open channel, each channel being normally received by the outer free edge of one of the terminal retainer flanges releasably to retain the bumper member on the retainer, the interior angle of the bumper member as formed being slightly less than the angle thereof when installed on the retainer whereby an initial force normally to retain the bumper member in place on the retainer results from the inherent resiliency of the bumper material, the medial portion of the bumper member being substantially spaced from the medial portion of the retainer and being spaced at the greatest distance from the protected surface of any part of the bumper member such that impacts on the bumper member are normally on said medial portion thereby to permit deflection of the bumper member medial portion on impact and absorption of the energy of the impact by resilient deformation of the bumper member by substantial spreading of the legs thereof by a camming action of the retainer flanges, and (1) the angle between each leg of the bumper member and the protected surface under all degrees of deformation and deflection of such leg and (2) the spacing from the protected surface of a point or zone of contact between such leg and the corresponding retainer flange being so related as to preclude the edges of the legs from contacting the protected surface for any extent and direction of deformation and deflection of the bumper member upon impact.

7. A bumper guard according to claim 6, wherein each terminal retainer flange includes an outwardly convexly curved front deflection surface adjacent to the outer free edge thereof and defining a surface providing a changing zone of contact between the corresponding bumper member leg and such retainer flange to outwardly deflect the bumper member leg portions on deflection of the bumper member medial portion toward the retainer medial portion.

8. A bumper guard according to claim 6, wherein the mounting means includes an energy absorbing element between the retainer and the protected surface.

9. A bumper guard according to claim 6, wherein the retainer medial portion includes a longitudinally oriented offset portion defining an elongated recess and wherein the spacer has at least a portion thereof received within the recess of the retainer medial portion.

10. A bumper guard according to claim 6, wherein the bumper member extends longitudinally beyond the end of the retainer and further comprising an end cap member having an internal portion and an external portion, with respect to the bumper member, the internal portion substantially conforming to the internal shape of the bumper member and being bonded to the bumper member medial portion to retain the end cap member during impact of the bumper guard, the end cap member internal portion as received within the bumper member being free from engagement with the retainer, thereby permitting deflection and deformation of the bumper member upon impact.

11. A bumper guard according to claim 6, wherein there are two bumper members mounted on a retainer in end-to-end abutting relation to form a joint and further comprising as a splice piece at the joint for transferring deformation across the joint a strip of resilient material shaped to match the internal contours of the bumper members and positioned such that a portion of each bumper member overlaps and engages a portion of the splice piece.

* * * * *